(12) United States Patent
Sodagar

(10) Patent No.: US 11,616,822 B2
(45) Date of Patent: Mar. 28, 2023

(54) SESSION-BASED INFORMATION FOR DYNAMIC ADAPTIVE STREAMING OVER HTTP

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/029,948

(22) Filed: Sep. 23, 2020

(65) Prior Publication Data

US 2021/0099508 A1    Apr. 1, 2021

Related U.S. Application Data

(60) Provisional application No. 62/908,251, filed on Sep. 30, 2019.

(51) Int. Cl.
| | |
|---|---|
| G06F 15/16 | (2006.01) |
| H04L 65/65 | (2022.01) |
| H04N 21/84 | (2011.01) |
| H04N 21/435 | (2011.01) |
| H04L 67/02 | (2022.01) |

(52) U.S. Cl.
CPC .............. *H04L 65/65* (2022.05); *H04L 67/02* (2013.01); *H04N 21/435* (2013.01); *H04N 21/84* (2013.01)

(58) Field of Classification Search
CPC ..... H04L 65/608; H04L 67/02; H04N 21/435; H04N 21/84

USPC ......................................................... 709/219
See application file for complete search history.

(56) References Cited

U.S. PATENT DOCUMENTS

| | | | | |
|---|---|---|---|---|
| 2016/0261665 | A1* | 9/2016 | Stockhammer | H04N 21/8456 |
| 2018/0176650 | A1* | 6/2018 | Hirabayashi | H04N 21/47202 |
| 2018/0205975 | A1* | 7/2018 | Oh | H04N 21/4884 |
| 2020/0228775 | A1* | 7/2020 | Sakai | H04N 13/282 |
| 2021/0021880 | A1* | 1/2021 | Katsumata | H04N 21/4394 |

OTHER PUBLICATIONS

International Search Report dated Jan. 27, 2021 in Application No. PCT/US2020/052804, (18 pages).

(Continued)

*Primary Examiner* — Alan S Chou
(74) *Attorney, Agent, or Firm* — Arentfox Schiff LLP

(57) ABSTRACT

Aspects of the disclosure provide methods, apparatuses, and non-transitory computer-readable mediums for receiving media data of a session. One apparatus includes processing circuitry that receives a media presentation description (MPD) file and one or more session-based description (SBD) files. The MPD file includes one or more essential property descriptors for session-based dynamic adaptive streaming over hypertext transfer protocol (DASH). Each of the one or more essential property descriptors for session-based DASH is associated with a different SBD file in the one or more SBD files. The processing circuitry determines, for a period in the MPD file, whether the period has a supplemental property descriptor for session-based DASH. The processing circuitry applies all of the one or more SBD files to the period in response to the period not having any supplemental property descriptor for session-based DASH.

15 Claims, 6 Drawing Sheets

(56) References Cited

OTHER PUBLICATIONS

Information technology—Dynamic adaptive streaming over HTTP (DASH)—Part 8: Session based DASH operations, Jan. 31, 2019 (10 pages).
Information technology—Dynamic adaptive streaming over HTTP (DASH)—Part 1: Media presentation description and segment formats, N18609, Aug. 12, 2019 (287 pages).
Appendix A, DASH-MPD (21 pages).
Appendix B, DASH-MPD-UP (2 pages).
Appendix C, example_G1 (3 pages).
Appendix D, example_G2 (3 pages).
Appendix E, example_G3 (3 pages).
Appendix F, example_G4 (4 pages).
Appendix G, example_G5 (3 pages).
Appendix H, example_G6 (2 pages).
Appendix I, example_G7 (3 pages).
Appendix J, example_G8 (3 pages).
Appendix K, example_G9 (3 pages).
Appendix L, example_G10 (3 pages).
Appendix M, example_G11 (3 pages).
Appendix N, example_G11_remote.period (2 pages).
Appendix O, example_G12 (3 pages).
Appendix P, example_G13-1 (2 pages).
Appendix Q, example_G13-2 (2 pages).
Appendix R, example_G14 (2 pages).
Appendix S, example_G15 (3 pages).
Appendix T, example_G16 (3 pages).
Appendix U, example_G17 (3 pages).
Appendix V, example_G18 (3 pages).
Appendix W, example_H1 (2 pages).
Appendix X, example_H2 (3 pages).
Appendix Y, example_H3 (3 pages).
Appendix Z, example_I1 (2 pages).
Appendix AA, example_I2 (2 pages).
Appendix AB, example_I3 (2 pages).
Appendix AC, example_I4 (2 pages).
Appendix AD, License (2 pages).
Appendix AE, README.md (2 pages).
Appendix AF, Figure 4 (2 pages).
Appendix AG, Figure-1 (2 pages).
Appendix AH, Figure-2 (2 pages).
Appendix AI, Figure-3 (2 pages).
Appendix AJ, Figure-5 (2 pages).
Appendix AK, Figure-6 (2 pages).
Appendix AL, Figure-D.1 (2 pages).
Appendix AM, Figure-K.1 (2 pages).

\* cited by examiner

| Element or Attribute Name | Use | Description |
|---|---|---|
| EssentialProperty | | Instantiation of EssentialProperty for session-based DASH operations |
| @id | CM | If more than one Essential Property element is used in the MPD, this value shall be a unique non-negative integer. |
| @schemeIdUri | M (string) | Shall be "urn:mpeg:dash:session-based-description:2019". |
| @value | M | URL to corresponding SBD. |

Legend:
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs=0>
Elements are bold; attributes are non-bold and preceded with an @.

FIG. 3

| Element or Attribute Name | Use | Description |
|---|---|---|
| SupplementalProperty | | Instantiation of SupplementalProperty for session-based DASH operations |
| @id | M | The EssentialProperty Descriptor with equal @id at MPD indicates the SBD is applied to this Period.<br><br>If Period doesn't have any SupplementalProperty, all SBDs are applied to this Period.<br><br>If this value is not found in any EssentialProperty Descriptors' @id of MPD, then no SBD is applied to this Period. |
| @schemeIdUri | M (string) | Shall be "urn:mpeg:dash:session-based-description:2019". |

Legend:
For attributes: M=Mandatory, O=Optional, OD=Optional with Default Value, CM=Conditionally Mandatory.
For elements: <minOccurs> ... <maxOccurs> (N=unbounded)
Note that the conditions only holds without using xlink:href. If linking is used, then all attributes are "optional" and <minOccurs=0>
Elements are bold, attributes are non-bold and preceded with an @.

*FIG. 4*

SESSION-BASED INFORMATION FOR DYNAMIC ADAPTIVE STREAMING OVER HTTP

INCORPORATION BY REFERENCE

This present application claims the benefit of priority to U.S. Provisional Application No. 62/908,251, "PERIOD DEPENDENT SESSION-BASED DASH OPERATIONS" filed on Sep. 30, 2019, which is incorporated by reference herein in its entirety.

TECHNICAL FIELD

The present disclosure describes embodiments generally related to session-based information for dynamic adaptive streaming over hypertext transfer protocol (DASH).

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Moving Picture Experts Group (MPEG) has started a new part in dynamic adaptive streaming over hypertext transfer protocol (DASH) standardization for session-based DASH operation. While a media presentation description (MPD) file is generic for all clients, a client may acquire a side file, such as a session-based description (SBD) file, which provides instructions for the client to make the MPD specific for the session. However, in the current design, a single SBD is applied to the entire MPD.

SUMMARY

Aspects of the disclosure provide apparatuses for retrieving media data of a session. One apparatus includes processing circuitry that receives a media presentation description (MPD) file and one or more session-based description (SBD) files. The MPD file includes one or more essential property descriptors for session-based dynamic adaptive streaming over hypertext transfer protocol (DASH). Each of the one or more essential property descriptors for session-based DASH is associated with a different SBD file in the one or more SBD files. The processing circuitry determines, for a period in the MPD file, whether the period has a supplemental property descriptor for session-based DASH. The processing circuitry applies all of the one or more SBD files to the period in response to the period not having any supplemental property descriptor for session-based DASH.

In an embodiment, each of the one or more essential property descriptors for session-based DASH includes an identification (ID) value that identifies the associated SBD file.

In an embodiment, the processing circuitry determines, in response to the period having the supplemental property descriptor for session-based DASH, whether an ID value in the supplemental property descriptor for session-based DASH is included in one of the one or more essential property descriptors for session-based DASH.

In an embodiment, the processing circuitry applies one SBD file associated with the ID value in the one or more essential property descriptors for session-based DASH to the period in response to the ID value in the supplemental property descriptor for session-based DASH being included in the one of the one or more essential property descriptors for session-based DASH.

In an embodiment, the processing circuitry determines that none of the one or more SBD files is to be applied to the period in response to the ID value in the supplemental property descriptor for session-based DASH not corresponding to any ID value in the one or more essential property descriptors for session-based DASH.

In an embodiment, each of the one or more essential property descriptors for session-based DASH includes an attribute indicating a uniform resource locator (URL) address for the associated SBD file.

In an embodiment, each of the one or more essential property descriptors for session-based DASH includes an attribute indicating that the respective essential property descriptor is used for session-based DASH, and the supplemental property descriptor for session-based DASH includes an attribute indicating that the supplemental property descriptor is used for session-based DASH.

In an embodiment, the processing circuitry applies all of the one or more SBD files to a request associated with the period based on a predefined order of the one or more SBD files.

Aspects of the disclosure provide methods for retrieving media data of a session. In one method, an MPD file and one or more SBD files are received. The MPD file includes one or more essential property descriptors for session-based DASH. Each of the one or more essential property descriptors for session-based DASH is associated with a different SBD file in the one or more SBD files. For a period in the MPD file, whether the period has a supplemental property descriptor for session-based DASH is determined. All of the one or more SBD files are applied to the period in response to the period not having any supplemental property descriptor for session-based DASH.

Aspects of the disclosure also provide non-transitory computer-readable mediums storing instructions which when executed by a computer for receiving media data for a session cause the computer to perform any one or a combination of the methods for receiving media data of the session.

BRIEF DESCRIPTION OF THE DRAWINGS

Further features, the nature, and various advantages of the disclosed subject matter will be more apparent from the following detailed description and the accompanying drawings in which:

FIG. 3 shows an exemplary table that lists essential property descriptor attributes for session-based DASH;

FIG. 4 shows an exemplary table that lists supplemental property descriptor attributes for session-based DASH;

DETAILED DESCRIPTION OF EMBODIMENTS

Figure 1:
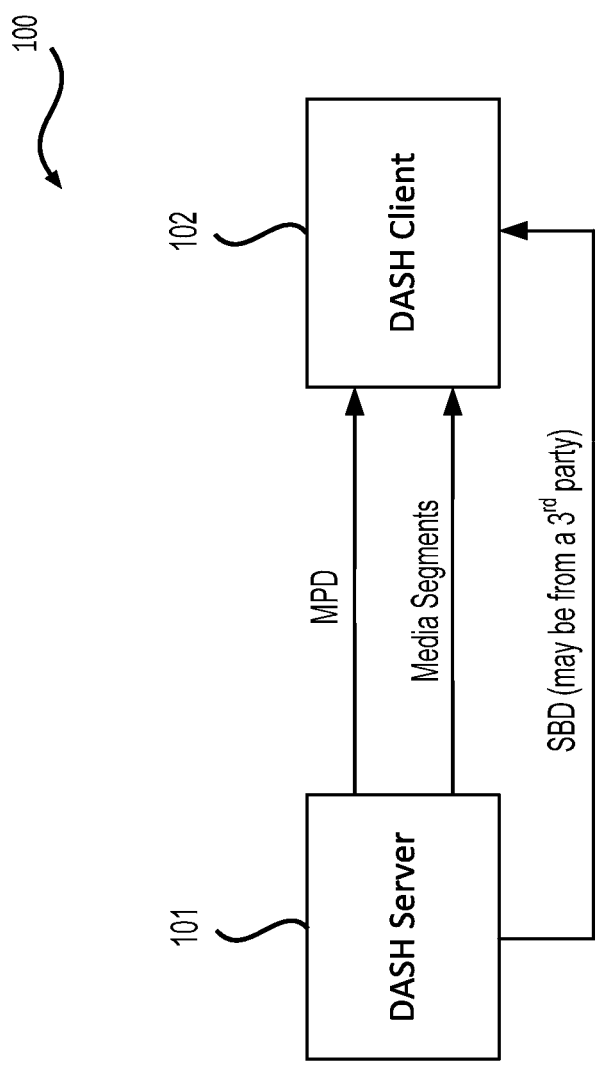
FIG. 1 shows an exemplary session-based dynamic adaptive streaming over hypertext transfer protocol (DASH) system according to an embodiment of the disclosure.

I. Dynamic Adaptive Streaming Over Hypertext Transfer Protocol (DASH) and Media Presentation Description (MPD)

Dynamic adaptive streaming over hypertext transfer protocol (DASH) is an adaptive bitrate streaming technique that enables streaming of media content using hypertext transfer protocol (HTTP) infrastructures, such as web servers, content delivery networks (CDNs), various proxies and caches, and the like. DASH supports both on-demand and live streaming from a DASH server to a DASH client, and allows the DASH client to control a streaming session, so that the DASH server does not need to cope with an additional load of stream adaptation management in large scale deployments. DASH also allows the DASH client a choice of streaming from various DASH servers, and therefore achieving further load-balancing of the network for the benefit of the DASH client. DASH provides dynamic switching between different media tracks, for example, by varying bit-rates to adapt to network conditions.

In DASH, a media presentation description (MPD) file provides information for the DASH client to adaptively stream media content by downloading media segments from the DASH server. The MPD file can be fragmented and delivered in parts to reduce session start-up delay. The MPD file can be also updated during the streaming session. In some examples, the MPD file supports expression of content accessibility features, ratings, and camera views. DASH also supports delivering of multi-view and scalable coded content.

The MPD file can contain a sequence of one or more periods. Each of the one or more periods can be defined by a period element in the MPD file. The MPD file can include an availableStartTime attribute for the MPD and a start attribute for each period. For media presentations with a dynamic type (e.g., used for live services), a sum of the start attribute of the period and the MPD attribute availableStartTime and the duration of the media segment can indicate the availability time of the period in coordinated universal time (UTC) format, in particular the first media segment of each representation in the corresponding period. For media presentations with a static type (e.g., used for on-demand services), the start attribute of the first period can be 0. For any other period, the start attribute can specify a time offset between the start time of the corresponding period relative to the start time of the first period. Each period can extend until the start of the next period, or until the end of the media presentation in the case of the last period. Period start times can be precise and reflect the actual timing resulting from playing the media of all prior periods.

Each period can contain one or more adaptations sets, and each of the adaptation sets can contain one or more representations for the same media content. A representation can be one of a number of alternative encoded versions of audio or video data. The representations can differ by encoding types, e.g., by bitrate, resolution, and/or codec for video data and bitrate, and/or codec for audio data. The term representation can be used to refer to a section of encoded audio or video data corresponding to a particular period of the multimedia content and encoded in a particular way.

Adaptation sets of a particular period can be assigned to a group indicated by a group attribute in the MPD file. Adaptation sets in the same group are generally considered alternatives to each other. For example, each adaptation set of video data for a particular period can be assigned to the same group, such that any of the adaptation set can be selected for decoding to display video data of the multimedia content for the corresponding period. The media content within one period can be represented by either one adaptation set from group 0, if present, or the combination of at most one adaptation set from each non-zero group, in some examples. Timing data for each representation of a period can be expressed relative to the start time of the period.

A representation can include one or more segments. Each representation can include an initialization segment, or each segment of a representation can be self-initializing. When present, the initialization segment can contain initialization information for accessing the representation. In some cases, the initialization segment does not contain media data. A segment can be uniquely referenced by an identifier, such as a uniform resource locator (URL), uniform resource name (URN), or uniform resource identifier (URI). The MPD file can provide the identifiers for each segment. In some examples, the MPD file can also provide byte ranges in the form of a range attribute, which can correspond to the data for a segment within a file accessible by the URL, URN, or URI.

Each representation can also include one or more media components, where each media component can correspond to an encoded version of one individual media type, such as audio, video, or timed text (e.g., for closed captioning). Media components can be time-continuous across boundaries of consecutive media segments within one representation.

In some embodiments, the DASH client can access and download the MPD file from the DASH server. That is, the DASH client can retrieve the MPD file for use in initiating a live session. Based on the MPD file, and for each selected representation, the DASH client can make several decisions, including determining what is the latest segment that is available on the server, determining the segment availability start time of the next segment and possibly future segments, determining when to start playout of the segment and from which timeline in the segment, and determining when to get/fetch a new MPD file. Once the service is played out, the client can keep track of drift between the live service and its own playout, which needs to be detected and compensated.

II. Session-based DASH Operation and Session-based Description (SBD)

It is noted that the MPD file can be generic for all DASH clients. In order to make the MPD file specific for a session of the DASH client, moving picture expert group (MPEG) provides session-based DASH operations. In session-based DASH operations, the DASH client can receive a side file, such as a session-based description (SBD) file, which provides instructions for the DASH client to customize the MPD file per session and possibly per client. However, in some related examples, the session-based DASH operation is application-specific. That is, for each new application, a new SBD format is required.

This disclosure presents a generalized SBD format that can provide a single solution for all session-based applications.

FIG. 1 shows an exemplary architecture of session-based DASH operations (100) according to an embodiment of the disclosure. In the session-based DASH operation architecture (100), an MPD file is sent from a DASH server (101) (e.g., a content server) to a DASH client (102). The DASH client (102) can receive media segments from the DASH server (101) based on the MPD file. In addition, the DASH client (102) can receive an SBD file from the DASH server (101) or a third party (e.g., session controller).

According to aspects of the disclosure, the SBD file can include a plurality of time ranges and corresponding key-value pairs (or name-value pairs), along with additional metadata. The SBD file can be referenced in the MPD file by, for example, a URL. The SBD file can be used to customize the MPD file received by the DASH client (102) to be specific for a session of the DASH client (102). For example, the SBD file can allow adding session-specific elements to segment URLs without generating unique per-session MPDs.

Figure 2:
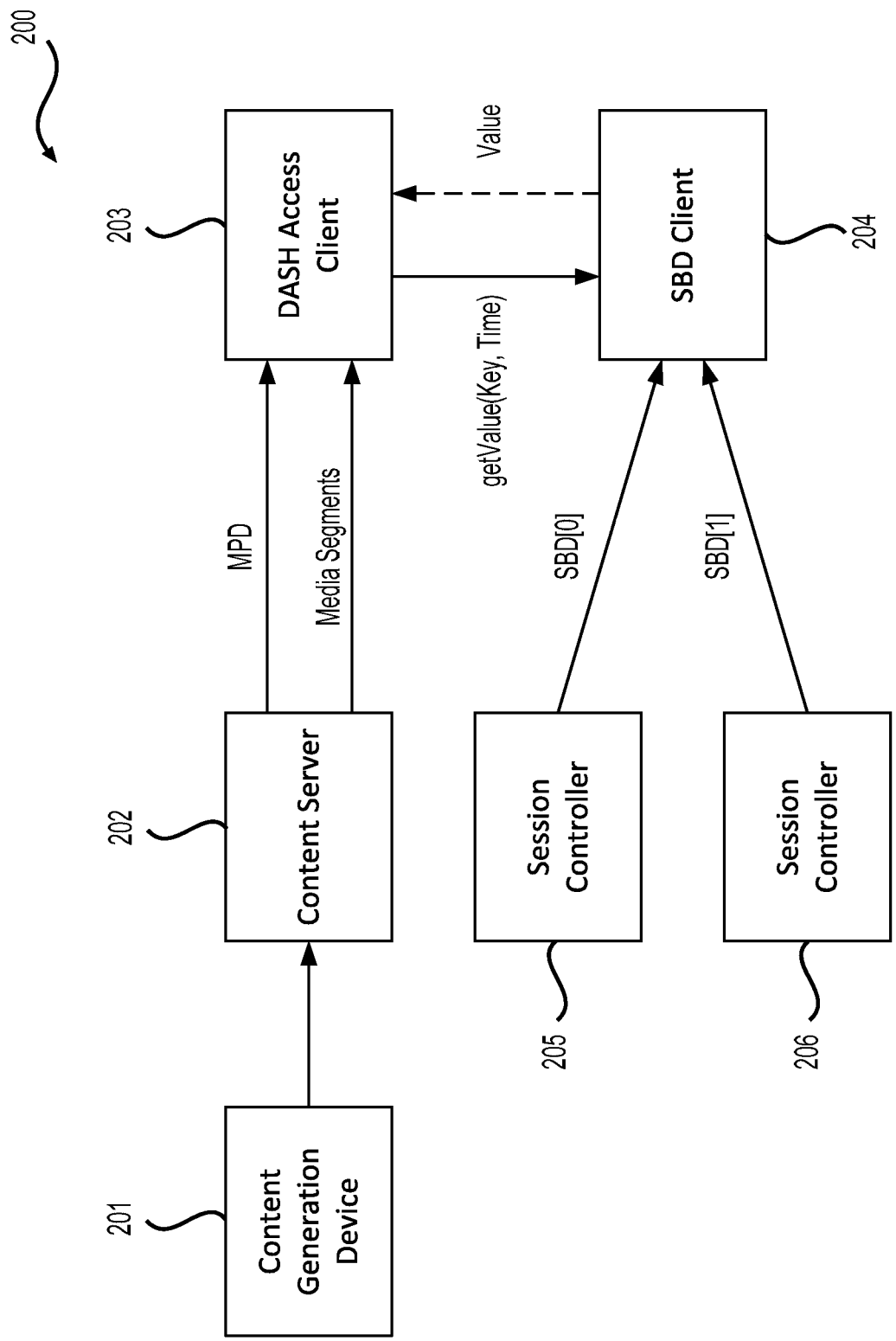
FIG. 2 shows another exemplary session-based DASH system according to an embodiment of the disclosure.

FIG. 2 shows another exemplary session-based DASH operation architecture 200 according to an embodiment of the disclosure. In the session-based DASH operation architecture 200, multimedia content is prepared and generated by a content generation device (201) (e.g., smartphone) which can include an audio source (e.g., microphone) and a video source (e.g., video camera). The multimedia content can be stored by the content generation device (201) or sent to a content server (202) which can store various multimedia contents. The content server (202) can receive a request from client devices, such as a DASH access client (203), for one or more media segments of the multimedia content. The multimedia content is described by an MPD file, which can be stored and updated by the content server (202) and accessed by the client devices including the DASH access client (203) to retrieve the media segments.

In order to retrieve a session-specific media segment, the DASH access client (203) can send a request to an SBD client (204) (e.g., session client) for accessing an SBD file that is received by the SBD client (204) and includes a plurality of time ranges and corresponding key-value pairs for the current session. For example, the DASH access client (203) can send a key name and a time range to the SBD client (204), which then parses the key name and the time range and returns a value corresponding to the key name and the time range to the DASH access client (203). The DASH access client (203) can include the value in a query of a segment URL which can be sent to the content server (202) for requesting the session-specific media segment when the segment request is a HTTP GET or partial GET request.

It is noted that the SBD client (204) can receive multiple SBD files from different session controllers, such as a session controller (205) and a session controller (206).

According to aspects of the disclosure, any or all of the features of the content server (202) (e.g., DASH server) can be implemented on one or more devices of a content delivery network (CDN), such as routers, bridges, proxy devices, switches, or other devices. The content server (202) can include a request processing unit configured to receive network requests from the client devices (e.g., DASH access client (203)). For example, the request processing unit can be configured to receive HTTP GET or partial GET requests and provide data of multimedia contents in response to the requests. The requests can specify a segment using a URL of the segment. In some examples, the requests can also specify one or more byte ranges of the segment, thus comprising partial GET requests. The request processing unit can further be configured to service HTTP HEAD requests to provide header data of a segment.

In some embodiments, the content generation device (201) and the content server (202) can be coupled by a wireless network or a wired network, or can be directly communicatively coupled.

In some embodiments, the content generation device (201) and the content server (202) can be included in a same device.

In some embodiments, the content server (202) and the session controllers (205)-(206) can be included in a same device.

In some embodiments, the content server (202) and the DASH access client (203) can be coupled by a wireless network or a wired network.

In some embodiments, the SBD client (204) and the session controllers (205)-(206) can be coupled by a wireless network or a wired network, or can be directly communicatively coupled.

In some embodiments, the DASH access client (203) and the SBD client (204) can be included in a same device.

According to aspects of the disclosure, in order to link multiple SBDs to an MPD, one or more essential property descriptors for session-based DASH can be used at an MPD level and each essential property descriptor for session-based DASH includes similar or same essential property descriptor attributes.

FIG. 3 shows an exemplary table (300) that lists essential property descriptor attributes for session-based DASH at an MPD level according to some embodiments of the disclosure. In the table (300), an attribute @schemeIdUri is set to be, for example, "urn:mpeg:dash:session-based-description:2019", to indicate that the essential property descriptor attributes listed in the table (300) are used for session-based DASH. For example, an attribute @id is used to identify an SBD file so that different values in the @id attribute can identify different SBD files for this MPD. Therefore, the MPD can have one or more essential property descriptors for session-based DASH (e.g., one or more table (300)), each corresponding to a different SBD file. In addition, an attribute @value in each essential property descriptor for session-based DASH is used to indicate the URL of the corresponding SBD file. It is noted that one or more of these SBDs can be active at any moment of the session, depending on the signaling at period levels.

According to aspects of the disclosure, in order to apply different SBDs to various periods, a supplemental property descriptor for session-based DASH can be allowed at a period level. The supplemental property descriptor for session-based DASH can define which SBD file(s) can be applied to a period.

FIG. 4 shows an exemplary table (400) that lists supplemental property descriptor attributes for session-based DASH at a period level according to some embodiments of the disclosure. That is, each period in the MPD can have such a supplemental property descriptor table (400). In the table (400), an attribute @schemeIdUri is set to be, for example, "urn:mpeg:dash:session-based-description:2019", to indicate that the supplemental property descriptor attributes listed in the table (400) are used for session-based DASH. For example, an attribute @id is used to identify which SBD file(s) is applied to the corresponding period. For a period, if the @id value in the table (400) is equal to a @id value in the table (300), an SBD file corresponding to the @id value in the table (300) can be applied to the period. If the @id value in the table (400) is not equal to any @id value in the table (300), no SBD file can be applied to the period. If there is not any supplemental property descriptor attribute with the same @schemeIdUri as used in the table (300) for the period, all SBD files listed in the table (300) can be applied to the period. In an embodiment, an order of application of these SBD files is according to an order of essential property descriptors corresponding to these SBD files, for example, from left to right (or top to bottom) in an extensible markup language (XML) format.

For example, in the table (300), the @id value can be 1 or 2, @id=1 corresponds to SBD[0] and @id=2 corresponds to SBD[1]. For period 1, the @id value in the table (400) is set to be 1, indicating that SBD[0] can be applied to period 1. For period 2, there is no table (400) or the @schemeIdUri value in the table (400) is not as same as the @schemeIdUri value in the table (300), indicating that both SBD[0] and SBD[1] can be applied to period 2. For period 3, the @id value in the table (400) is set to be 3, indicating that no SBD can be applied to period 3.

According to aspects of the disclosure, besides the linking information added in the MPD, there is no additional information added in the MPD to signal the linking between MPD and SBD. Based on the linking information, one or more SBDs can be described and separated with a @id indicator at the MPD level. Which SBD(s) can be applied to each period in the MPD is determined based on the information added at the period level.

In an embodiment, for a period, if a supplemental property descriptor @schemeIdUri is not same as the essential property descriptor @schemeIdUri at the MPD level, all SBDs corresponding to the essential property descriptors @id and @value can be applied to the period. If the supplemental property descriptor @schemeIdUri is the same as the essential property descriptor @schemeIdUri at the MPD level, one or more SBDs can be applied to the period. In an example, if a period element @id in the supplemental property descriptors of the period is equal to one of the @id values listed in the MPD essential property descriptors, then an SBD corresponding to the period element @id can be applied to the period. In an example, if the period element @id in the supplemental property descriptors of the period is not equal to any of the @id values listed in the MPD essential property descriptors, then no SBD can be applied to the period.

According to aspects of the disclosure, when one or more SBD files are applied to a period, the one or more SBD files can be applied to a request during this period. For example, the request can be a segment request, an MPD update request, or an XML linking language (XLINK) request. One or more key-value pairs of each SBD file can be appended to a query of a URL of the request or included in a HTTP header of the request. The request can be sent from the DASH client (102) to the DASH server (101) in an example, or sent from the DASH access client (203) to the content server (202) in another example.

In an embodiment, when multiple SBD files are to be applied to the request, the multiple SBD files are applied according to a predefined order, such as from left to right, or top to bottom in the XML format.

III. Flowchart

Figure 5:
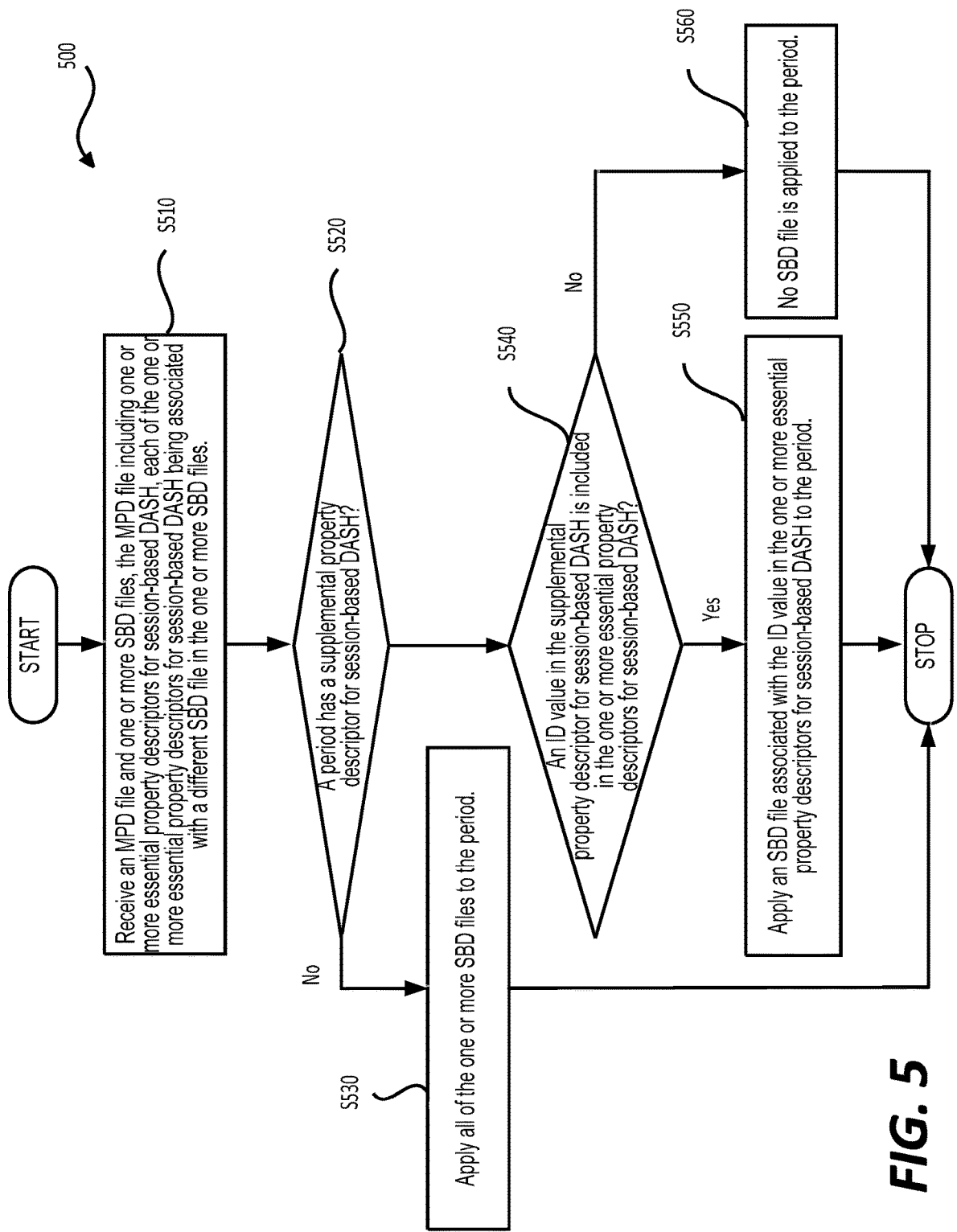
FIG. 5 shows a flow chart outlining a process example in accordance with some embodiments.

FIG. 5 shows a flow chart outlining a process (500) according to an embodiment of the disclosure. In various embodiments, the process (500) is executed by processing circuitry, such as the processing circuitry in the DASH client (102), the processing circuitry in the DASH access client (203), the processing circuitry in the SBD client (204), and the like. In some embodiments, the process (500) is implemented in software instructions, thus when the processing circuitry executes the software instructions, the processing circuitry performs the process (500). The process (500) starts at (S510), where the process (500) receives an MPD file and one or more SBD files. The MPD file includes one or more essential property descriptors for session-based DASH. Each of the one or more essential property descriptors for session-based DASH is associated with a different SBD file in the one or more SBD files. In an embodiment, each of the one or more essential property descriptors for session-based DASH includes an ID value that identifies the associated SBD file. Then, the process (500) proceeds to step (S520).

At step (S520), the process (500) determines, for a period in the MPD file, whether the period has a supplemental property descriptor for session-based DASH. When the period is determined not to have the supplemental property descriptor for session-based DASH, the process (500) proceeds to step (S530). Otherwise, the process (500) proceeds to step (S540).

At step (S530), the process (500) applies all of the one or more SBD files to the period.

At step (S540), the process (500) determines whether an ID value in the supplemental property descriptor for session-based DASH is included in one of the one or more essential property descriptors for session-based DASH. When the ID value in the supplemental property descriptor for session-based DASH is determined to be included in one of the one or more essential property descriptors for session-based DASH, the process (500) proceeds to step (S550). Otherwise, the process (500) proceeds to step (S560).

At step (S550), the process (500) applies one SBD file associated with the ID value in the one or more essential property descriptors for session-based DASH to the period.

At step (S560), the process (500) determines that none of the one or more SBD files is to be applied to the period.

Then, the process (500) terminates.

In an embodiment, each of the one or more essential property descriptors for session-based DASH includes an attribute indicating a uniform resource locator (URL) address for the associated SBD file.

In an embodiment, each of the one or more essential property descriptors for session-based DASH includes an attribute indicating that the respective essential property descriptor is used for session-based DASH, and the supplemental property descriptor for session-based DASH includes an attribute indicating that the supplemental property descriptor is used for session-based DASH.

In an embodiment, the processing circuitry applies all of the one or more SBD files to a request associated with the period based on a predefined order of the one or more SBD files.

IV. Computer System

The techniques described above, can be implemented as computer software using computer-readable instructions and physically stored in one or more computer-readable media. For example, FIG. 6 shows a computer system (600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
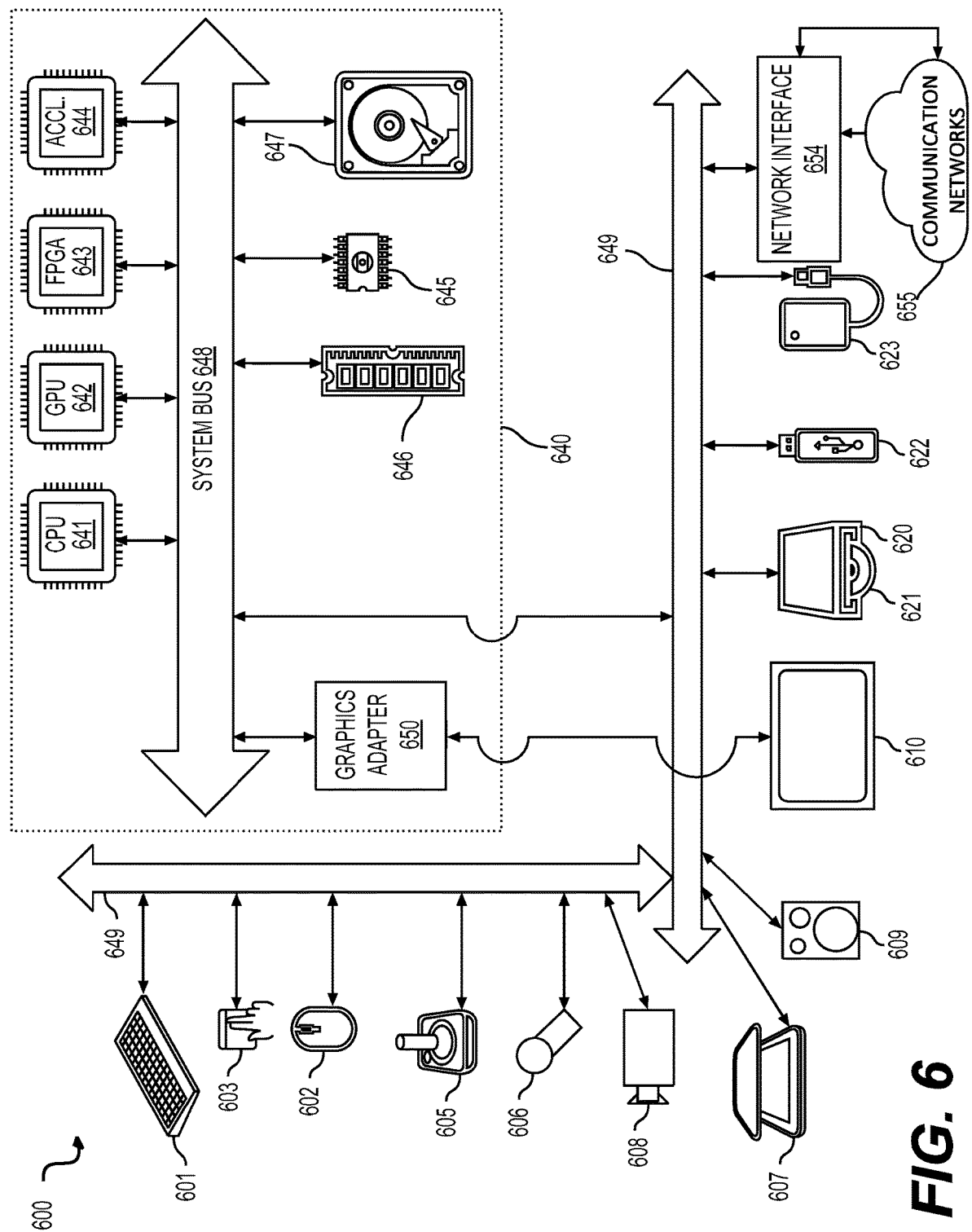
FIG. 6 is a schematic illustration of a computer system in accordance with an embodiment.

The components shown in FIG. 6 for computer system (600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (600).

Computer system (600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (601), mouse (602), trackpad (603), touch screen (610), data-glove (not shown), joystick (605), microphone (606), scanner (607), and camera (608).

Computer system (600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (610), data-glove (not shown), or joystick (605), but there can also be tactile feedback devices that do not serve as input devices), audio output devices (such as: speakers (609), headphones (not depicted)), visual output devices (such as screens (610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (610)) can be connected to a system bus (648) through a graphics adapter (650).

Computer system (600) can also include human accessible storage devices and their associated media such as optical media including CD/DVD ROM/RW (620) with CD/DVD or the like media (621), thumb-drive (622), removable hard drive or solid state drive (623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (600) can also include a network interface (654) to one or more communication networks (655). The one or more communication networks (655) can for example be wireless, wireline, optical. The one or more communication networks (655) can further be local, wide-area, metropolitan, vehicular and industrial, real-time, delay-tolerant, and so on. Examples of the one or more communication networks (655) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example USB ports of the computer system (600)); others are commonly integrated into the core of the computer system (600) by attachment to a system bus as described below (for example Ethernet interface into a PC computer system or cellular network interface into a smartphone computer system). Using any of these networks, computer system (600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (640) of the computer system (600).

The core (640) can include one or more Central Processing Units (CPU) (641), Graphics Processing Units (GPU) (642), specialized programmable processing units in the form of Field Programmable Gate Areas (FPGA) (643), hardware accelerators for certain tasks (644), and so forth. These devices, along with Read-only memory (ROM) (645), Random-access memory (646), internal mass storage such as internal non-user accessible hard drives, SSDs, and the like (647), may be connected through the system bus (648). In some computer systems, the system bus (648) can be accessible in the form of one or more physical plugs to enable extensions by additional CPUs, GPU, and the like. The peripheral devices can be attached either directly to the core's system bus (648), or through a peripheral bus (649). Architectures for a peripheral bus include PCI, USB, and the like.

CPUs (641), GPUs (642), FPGAs (643), and accelerators (644) can execute certain instructions that, in combination, can make up the aforementioned computer code. That computer code can be stored in ROM (645) or RAM (646). Transitional data can be also be stored in RAM (646), whereas permanent data can be stored for example, in the internal mass storage (647). Fast storage and retrieve to any of the memory devices can be enabled through the use of cache memory, that can be closely associated with one or more CPU (641), GPU (642), mass storage (647), ROM (645), RAM (646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (600) and specifically the core (640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (640) that are of non-transitory nature, such as core-internal mass storage (647) or ROM (645). The software implementing various embodiments of the present disclosure can be stored in such devices and executed by core (640). A computer-readable medium can include one or more memory devices or chips, according to particular needs. The software can cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition or as an alternative, the computer system can provide functionality as a result of logic hard-wired or otherwise embodied in a circuit (for example: accelerator (644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for receiving media data of a session, the method comprising:
   receiving a media presentation description (MPD) file and one or more session-based description (SBD) files, the MPD file including one or more periods and one or more essential property descriptors for session-based dynamic adaptive streaming over hypertext transfer protocol (DASH), each of the one or more essential property descriptors for session-based DASH being associated with a different SBD file in the one or more SBD files, and each of the one or more periods being associated with a different start time;
   determining, for one of the one or more periods in the MPD file, whether a supplemental property descriptor for session-based DASH has a same identification (ID) value as an essential property descriptor included in the MPD file for the one period of the one or more periods;
   in response to a determination that the supplemental property descriptor for session-based DASH has the same ID value as the essential property descriptor included in the MPD file for the one period of the one or more periods, applying an SBD file associated with the ID value of the essential property descriptor included in the MPD file to the one period of the one or more periods; and
   in response to a determination to the supplemental property descriptor for session-based DASH does not have the same ID value as the essential property descriptor included in the MPD file for the one period of the one or more periods, no SBD file is applied to the one period of the one or more periods.

2. The method of claim 1, wherein each of the one or more essential property descriptors for session-based DASH includes an ID value that identifies the associated SBD file.

3. The method of claim 2, wherein
   the determining is performed in response to a determination that at least one supplemental property descriptor for session-based DASH exists in the MPD file for the one period of the one or more periods.

4. The method of claim 1, wherein each of the one or more essential property descriptors for session-based DASH includes an attribute indicating a uniform resource locator (URL) address for the associated SBD file.

5. The method of claim 1, wherein
   each of the one or more essential property descriptors for session-based DASH includes an attribute indicating that the respective essential property descriptor is used for session-based DASH, and
   each supplemental property descriptor for session-based DASH includes an attribute indicating that the respective supplemental property descriptor is used for session-based DASH.

6. The method of claim 1, further comprising:
   in response to a determination that no supplemental property descriptor for session-based DASH exists in the MPD file for the one period of the one or more periods, applying all of the one or more SBD files to a request associated with the one period of the one or more periods based on a predefined order of the one or more SBD files.

7. An apparatus for receiving media data of a session, the apparatus comprising:
   processing circuitry configured to:
      receive a media presentation description (MPD) file and one or more session-based description (SBD) files, the MPD file including one or more periods and one or more essential property descriptors for session-based dynamic adaptive streaming over hypertext transfer protocol (DASH), each of the one or more essential property descriptors for session-based DASH being associated with a different SBD file in the one or more SBD files, and each of the one or more periods being associated with a different start time;
      determine, for one of the one or more periods in the MPD file, whether a supplemental property descriptor for session-based DASH has a same identification (ID) value as an essential property descriptor included in the MPD file for the one period of the one or more periods;
      in response to a determination that the supplemental property descriptor for session-based DASH has the same ID value as the essential property descriptor included exists in the MPD file for the one period of the one or more periods, apply an SBD file associated with the ID value of the essential property descriptor included in the MPD file to the one period of the one or more periods; and
      in response to a determination to the supplemental property descriptor for session-based DASH does not have the same ID value as the essential property descriptor included in the MPD file for the one period of the one or more periods, no SBD file is applied to the one period of the one or more periods.

8. The apparatus of claim 7, wherein each of the one or more essential property descriptors for session-based DASH includes an ID value that identifies the associated SBD file.

9. The apparatus of claim 8, wherein:
   the determining is performed in response to a determination that at least one supplemental property descriptor for session-based DASH exists in the MPD file for the one period of the one or more periods.

10. The apparatus of claim 7, wherein each of the one or more essential property descriptors for session-based DASH includes an attribute indicating a uniform resource locator (URL) address for the associated SBD file.

11. The apparatus of claim 7, wherein
   each of the one or more essential property descriptors for session-based DASH includes an attribute indicating that the respective essential property descriptor is used for session-based DASH, and each supplemental property descriptor for session-based DASH includes an attribute indicating that the respective supplemental property descriptor is used for session-based DASH.

12. The apparatus of claim 7, wherein the processing circuitry is further configured to:
in response to a determination that no supplemental property descriptor for session-based DASH exists in the MPD file for the one period of the one or more periods, apply all of the one or more SBD files to a request associated with the one period of the one or more periods based on a predefined order of the one or more SBD files.

13. A non-transitory computer-readable medium storing instructions which when executed by a computer for receiving media data of a session cause the computer to perform:
receiving a media presentation description (MPD) file and one or more session-based description (SBD) files, the MPD file including one or more periods and one or more essential property descriptors for session-based dynamic adaptive streaming over hypertext transfer protocol (DASH), each of the one or more essential property descriptors for session-based DASH being associated with a different SBD file in the one or more SBD files, and each of the one or more periods being associated with a different start time;
determining, for one of the one or more periods in the MPD file, whether a supplemental property descriptor for session-based DASH has a same identification (ID) value as an essential property descriptor included in the MPD file for the one period of the one or more periods;
in response to a determination that the supplemental property descriptor for session-based DASH has the same ID value as the essential property descriptor included in the MPD file for the one period of the one or more periods, applying an SBD file associated with the ID value of the essential property descriptor included in the MPD file to the one period of the one or more periods; and
in response to a determination to the supplemental property descriptor for session-based DASH does not have the same ID value as the essential property descriptor included in the MPD file for the one period of the one or more periods, no SBD file is applied to the one period of the one or more periods.

14. The non-transitory computer-readable medium of claim 13, wherein each of the one or more essential property descriptors for session-based DASH includes an ID value that identifies the associated SBD file.

15. The non-transitory computer-readable medium of claim 14, wherein the stored instructions cause the computer to perform:
the determining in response to a determination that at least one supplemental property descriptor for session-based DASH exists in the MPD file for the one period of the one or more periods.

* * * * *